US010696502B2

(12) United States Patent
Hodge

(10) Patent No.: US 10,696,502 B2
(45) Date of Patent: Jun. 30, 2020

(54) METHOD AND APPARATUS TO REDUCE VOLUME OCCUPIED BY DRY PARTICULATE COMMODITIES DURING TRANSPORTATION OR STORAGE

(71) Applicant: William E Hodge, Vancouver (CA)

(72) Inventor: William E Hodge, Vancouver (CA)

( * ) Notice: Subject to any disclaimer, the term of this patent is extended or adjusted under 35 U.S.C. 154(b) by 0 days.

(21) Appl. No.: 15/935,027

(22) Filed: Mar. 25, 2018

(65) Prior Publication Data

US 2018/0327200 A1    Nov. 15, 2018

Related U.S. Application Data

(60) Provisional application No. 62/503,784, filed on May 9, 2017.

(51) Int. Cl.
*B65G 69/02* (2006.01)
*B65G 69/20* (2006.01)
*B65G 65/32* (2006.01)
*B65G 67/04* (2006.01)

(52) U.S. Cl.
CPC ............ *B65G 69/02* (2013.01); *B65G 65/32* (2013.01); *B65G 67/04* (2013.01); *B65G 69/20* (2013.01); *B65G 2814/02* (2013.01)

(58) Field of Classification Search
CPC ........ B65G 69/02; B65G 69/20; B65G 65/32; B65G 67/04; B65G 2814/02; B65G 2201/04–047; B65B 1/22; B65B 1/26
USPC ........................................ 141/65, 71, 73, 74
See application file for complete search history.

(56) References Cited

U.S. PATENT DOCUMENTS

| | | | | |
|---|---|---|---|---|
| 4,084,390 A | * | 4/1978 | Schmachtel | B65B 1/22 53/511 |
| 4,199,264 A | * | 4/1980 | Uebel | B06B 1/168 366/123 |
| 4,752,137 A | * | 6/1988 | Moren | E04G 21/08 366/120 |
| 4,825,913 A | * | 5/1989 | Stott | B65B 39/04 141/114 |
| 6,554,543 B2 | * | 4/2003 | Hodge | E02D 3/054 366/123 |
| 6,619,832 B1 | * | 9/2003 | Steffen | B06B 1/16 366/120 |
| 6,637,280 B2 | * | 10/2003 | Potts | B06B 1/166 404/113 |
| 6,863,096 B2 | * | 3/2005 | Amano | B65B 1/26 141/59 |
| 7,866,353 B2 | * | 1/2011 | Combrink | B65B 1/22 141/10 |
| 8,069,882 B2 | * | 12/2011 | Combrink | B65B 1/22 141/102 |

(Continued)

FOREIGN PATENT DOCUMENTS

| | | | | | |
|---|---|---|---|---|---|
| DE | | 864820 C | * | 1/1953 | ............ B28B 1/08 |
| DE | | 10226490 C1 | * | 11/2003 | ............ B65G 69/02 |
| EP | | 0318172 A2 | * | 5/1989 | |

*Primary Examiner* — Marina A Tietjen
(74) *Attorney, Agent, or Firm* — Smiths IP

(57) ABSTRACT

A method and apparatus for increasing the specific weight of a dry particulate bulk commodity while said commodity is within a transportation vessel, using an array of pokers, these pokers equipped with the means of emitting lateral vibrations into the surrounding commodity and simultaneously creating an air flow through that dry commodity towards the nearest poker of the array.

10 Claims, 7 Drawing Sheets

(56) References Cited

U.S. PATENT DOCUMENTS

| | | | |
|---|---|---|---|
| 8,419,316 B2* | 4/2013 | Hodge | E02D 3/054 |
| | | | 405/271 |
| 9,346,568 B2* | 5/2016 | Korte | B65B 43/465 |
| 9,352,860 B2* | 5/2016 | Vollenkemper | B65B 43/465 |
| 9,540,123 B2* | 1/2017 | Vollenkemper | B65B 39/10 |
| 9,650,161 B2* | 5/2017 | Wehling | B65B 1/22 |
| 9,702,108 B2* | 7/2017 | Takeshima | E02D 3/054 |
| 9,885,979 B2* | 2/2018 | Toda | B65B 1/16 |
| 2012/0180435 A1* | 7/2012 | Stelluti | B65B 1/24 |
| | | | 53/469 |
| 2017/0291727 A1* | 10/2017 | Vollenkemper | B65B 43/50 |
| 2018/0009552 A1* | 1/2018 | Wehling | B65B 1/22 |
| 2018/0170693 A1* | 6/2018 | Nyquist | B65G 67/22 |

* cited by examiner

METHOD AND APPARATUS TO REDUCE VOLUME OCCUPIED BY DRY PARTICULATE COMMODITIES DURING TRANSPORTATION OR STORAGE

CROSS-REFERENCE TO RELATED APPLICATIONS

This application claims priority under 35 U.S.C 119(e) to U.S. Provisional Patent application No. 62/503,784 filed May 9, 2017, the disclosure of which is incorporated herein by reference.

BACKGROUND OF THE INVENTION

1. Field of the Invention

The apparatus and method described herein are believed to constitute a substantial potential benefit to those involved in the transportation of commodities such as cereal grains, rice, corn kernels, pulverized coal, and the like: goods which are conveyed dry and in bulk, hereinafter called the payload.

2. Description of Related Art

To the best of the inventor's knowledge the current method of filling freight containers with dry bulk commodities is to simply pour/discharge them into the vessel from an overhead chute without any further attempt to compact them into a smaller volume.

SUMMARY OF THE INVENTION

When a quantity of discrete dry particles are deposited into a receptacle they come to rest as an aggregation whose density of packing is generally quite loose. It has been found that applying vibrations to such a mass results in a decrease in the volume originally occupied, in other words, in densification. This is simply the result of adjacent particles being shuffled closer together, and thereby creating a mass of greater specific density.

It has been shown elsewhere (Hodge U.S. Pat. No. 6,554,543) that in the case of a water saturated 2-phased system, that is, wet particles submerged in water, packing density can be improved beyond what is attainable by vibration alone, by simultaneously applying seepage forces to the material surrounding the source of vibration. As a result of that discovery it is now believed that a similar result could be brought about by applying a vacuum/suction to a dry particulate mass, where the air flow is directed towards the source of the vibration.

Because of this reasoning, it is believed that if a relatively loose aggregation were subjected to the concurrent application of vibratory deformation and extraction of air from the void spaces between the discrete particles, with the air velocity vector being aligned towards the vibrator, the result should be that the dry solids would adopt a closer packing. In consequence, the specific weight of a given mass ought to increased, thereby making for a reduction of the volumetric space need to contain a particular weight of payload.

It should be emphasized that the benefit claimed here for dry commodities is not available to moist materials, since in the case of 3-phase aggregations (solid, liquid, gas), the cohesive forces concomitant with menisci formation would greatly reduce the benefits of vibration and deny the benefits of seepage forces.

It is also necessary to acknowledge that the optimal vibration parameters (frequency and amplitude), and perhaps the degree of atmospheric pressure diminution, are not known at this time for any of the commodities of interest. Additionally, the optimal separation between the individual pokers in plan, is currently undetermined since this is dependent on the physical/mechanical characteristics of the particles themselves. In consequence, a considerable amount of research is required prior to implementation of this novelty.

OBJECTS AND ADVANTAGES

Disclosure of the Invention

The novel apparatus specifically designed to achieve higher specific weight in a dry particulate mass is referred to herein as a poker. It is intended that a plurality of pokers be lowered into an empty freight container prior to the depositing the payload. The functional parts of the poker consists of two separate mechanism which are intended to be activated in unison. The lowermost of these is an axially eccentric weight which produces predominantly lateral vibrations when caused to rotate about its vertical axis. Towards the top of the poker is an extractor fan so as to cause air to be suctioned out from below.

The combined effect of the simultaneous activation of these two elements is to reshuffle the aggregation of the particulate mass surrounding the poker while that same mass is being subjected to an air flow through the body of the payload towards the source from which the vibratory deformations are emanating.

The physical concept underpinning this novel treatment of a dry particulate mass in order to cause it to assume a tighter aggregation is as follows: Since the particles reside in a gravitational field there will be a natural tendency for individual particles, while being jostled about by the vibratory energy, to find their way to a lower level/potential within the payload. In other words, it is probable that a particle while being displaced horizontally by the vibrations, will likely tend to end up falling into a space/void between particles in the layers beneath, thereby assuming a higher density of packing. This natural tendency should be further enhanced by the fact that such ongoing readjustments of the original configuration of the aggregation will be taking place in the draught/current of air flow being brought about by the suctional field/flux produced by the extractor fan inside the poker.

It is believed the best way to affect the packing density of a bulk commodity is to maintain the top of the air-permeable/pervious screen section, at or just below the surface of the ever-growing mound of deposition.

The extent to which the beneficial influence of an activated poker affects the payload peters out as the radial distance from the poker axis increases. Consequently, in order to treat an area larger that the effective compass of a single poker it is necessary to deploy an array of pokers spread out horizontally so that the full area of interest is adequately treated. Also, depending on the physical characteristics of the payload particles themselves, the spacing between pokers forming the array is expected to differ from, say, pulverized coal to cereal grains.

DESCRIPTION OF PREFERRED EMBODIMENT

Detailed Description of Apparatus

The fundamental mechanism which is the novel aspect of the apparatus and method claimed herein is referred to as the a poker.

Figure 1:
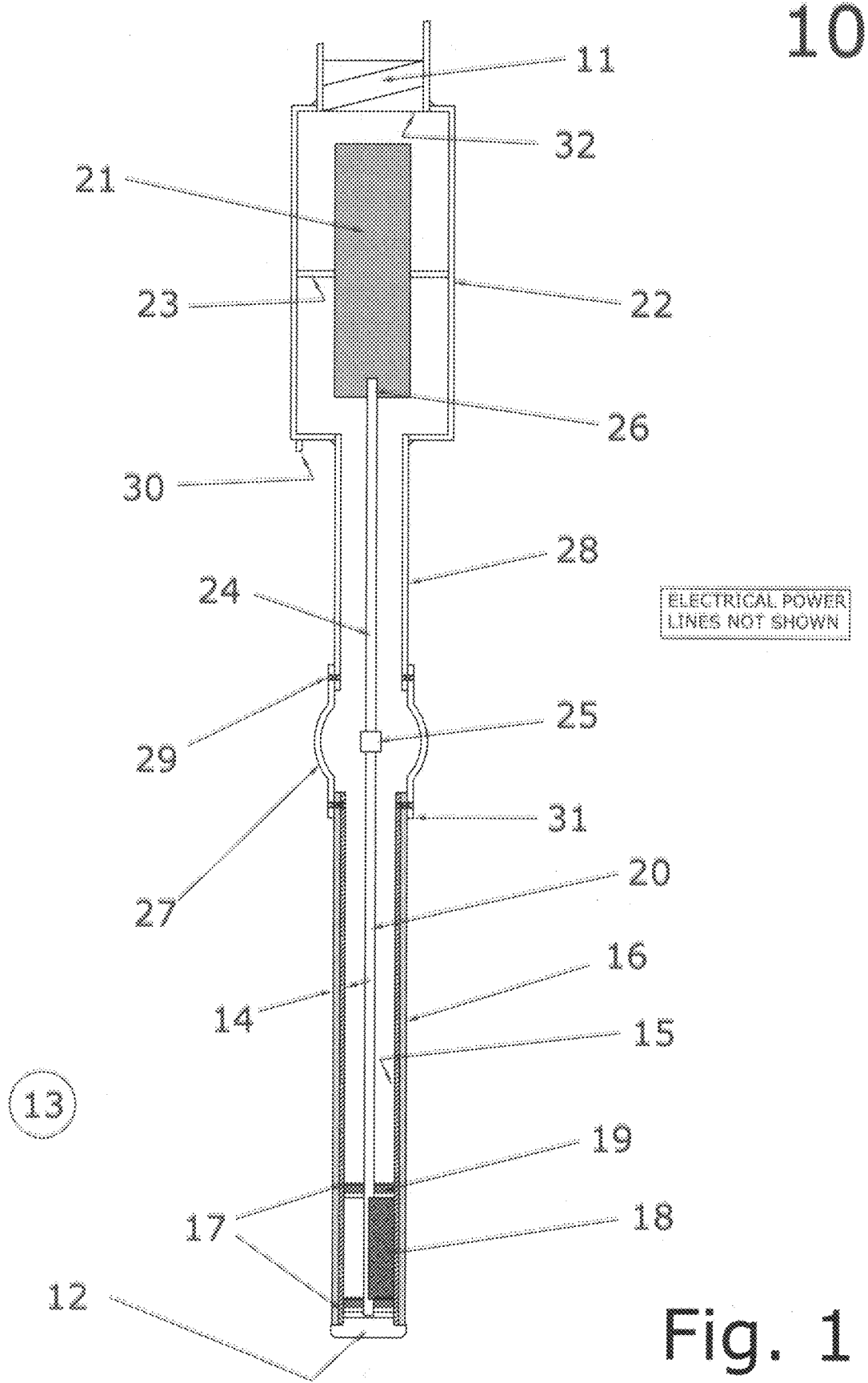
FIG. 1 is a side view through the long axis of the preferred embodiment of the commodity volume reduction poker of this invention.

With reference to FIG. 1: the poker 10 is comprised of several right cylindrical components fitted together either concentrically with respect to the vertical axis, or placed one atop another.

The uppermost functional element of the poker is a full-throat suction, or extractor fan 11, housed in a cylindrical section; its purpose is to maintain sub-atmospheric pressures within the poker while it is active.

LIST OF REFERENCE NUMERALS

| | |
|---|---|
| 10 | poker |
| 11 | extraction fan |
| 12 | bottom plug |
| 13 | payload |
| 14 | air-permeable conduit |
| 15 | perforated pipe |
| 16 | well screen |
| 17 | vibrating module |
| 18 | eccentric weight |
| 19 | roller bearings |
| 20 | lower drive shaft |
| 21 | electric motor |
| 22 | air-tight housing |
| 23 | supporting strut |
| 24 | upper drive shaft |
| 25 | universal joint |
| 26 | spline connection |
| 27 | flexible tubing |
| 28 | air-tight conduit |
| 29 | fasteners |
| 30 | depth sensor |
| 31 | top of well screen |
| 32 | base of fan |
| 40 | containment vessel |
| 41 | rectangular array |
| 42 | integrated assembly |
| 43 | cantilevered manifolds |
| 44 | support structure |
| 45 | filtered exhaust fan |
| 46 | pitched roof of manifold |

-continued

LIST OF REFERENCE NUMERALS

| | |
|---|---|
| 47 | treated payload |
| 48 | adaptable length conduit |
| 49 | top rim of container |
| 50 | telescoping pipe sections |
| 51 | stacked telescoped pipes |
| 52 | bead weld |
| 53 | cable |
| 54 | drum winch |
| 60 | hexagonal array of pokers |

The bottommost item is a solid plug 12 which is screwed to the lower end of the poker. It has two purposes: to prevent external material from entering into the body of the poker; and, to allow easy access to the inside of the lower poker to facilitate maintenance.

Immediately above the plug is as an intimately fitted pair of tubes 14 consisting of an inner perforated steel pipe 15 to which the outer conduit, a stainless steel well screen 16, is pre-bonded. An off-the-shelf instance of this piping is the stainless steel Johnson "pipe based" well screen. The function of this pairing is to provide access for the air outside the poker (from the payload side) to the annular space within the poker by means of the porous openings in this arrangement of conduits. It is the function of the outer well screen 16 to prevent particles of the payload 13 from entering the system while at the same time providing low-resistance entry for air sucked into the poker from the voids spaces within the surrounding commodity.

Figure 2:
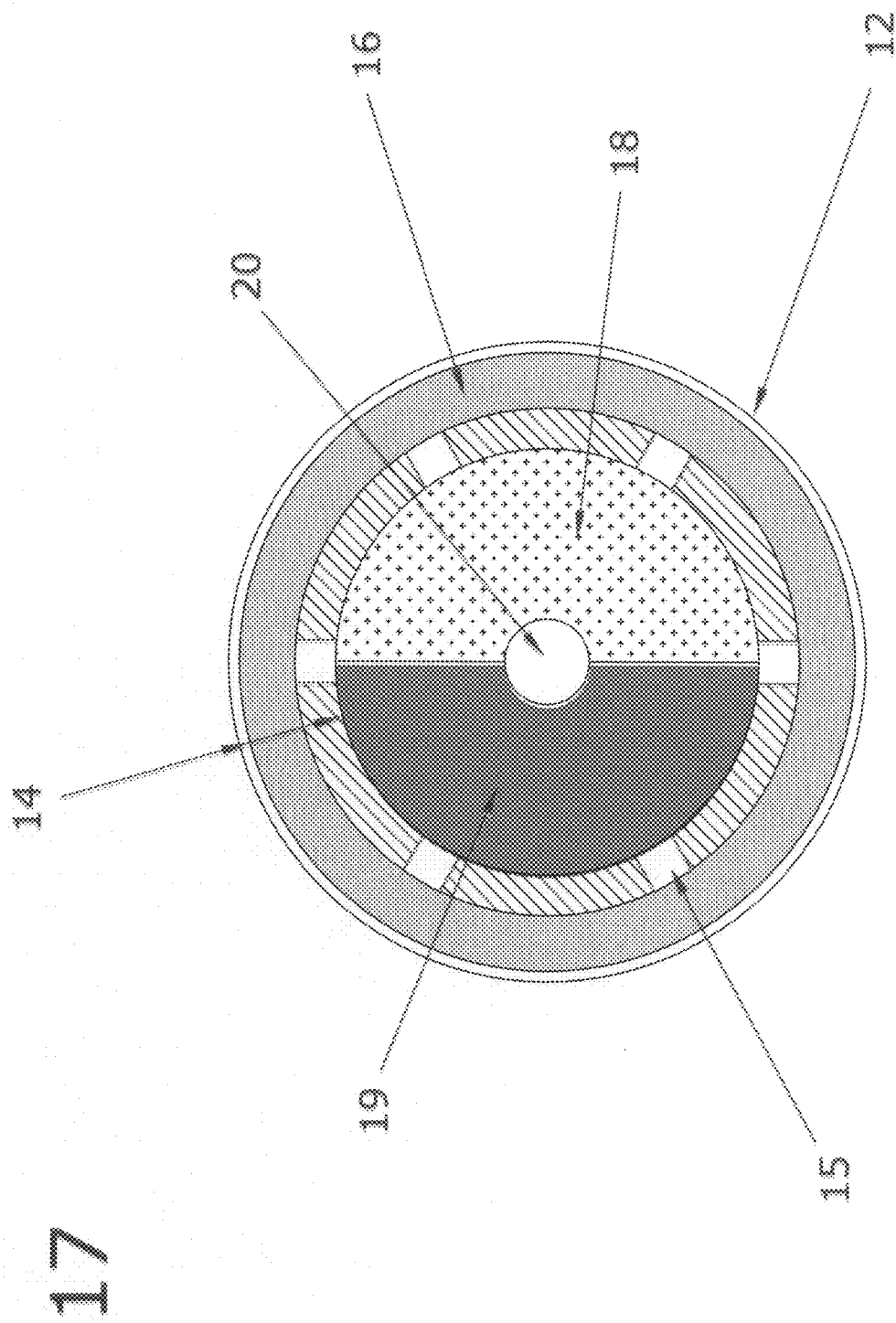
FIG. 2 is a plan view of a horizontal section taken through the poker at the level of the eccentric weight.

Close to the bottom of the air intake tubes, and secured thereto, is the vibration module 17. The components of this vibrator are shown as a horizontal sectional view in FIG. 2. The vibrations are generated by the rotation of an eccentric weight 18 about its vertical axis. The eccentric weight consists of one half of a metal shape derived by cutting an upright cylinder in two equal parts along its central vertical axis. This mechanism has been in use for many years, and as such, has no current novelty.

Roller bearings 19 at either end of the eccentric weight hold it in position central to the poker axis. The bearings are themselves fixed in place vertically, and in a horizontally orientation, using a conventional method such as by retaining rings anchored in groves cut into the perforated pipe 15.

The source of axial rotation is a drive shaft 20 fixed to the top of the eccentric, and which is in its turn, made to rotate by a speed controlled electric motor 21, located towards the top of the poker, just beneath the fan 11. The motor is held in its place within an air-tight housing 22 by radial struts 23. This arrangement allows air from below to pass around the motor to exit the apparatus through the fan 11.

The drive shaft is comprised of three parts: an upper 24 and a lower 20 straight bar, with a universal joint 25 connecting them at about mid-height.

The top of the upper shaft is joined to the motor drive using a male/female spline-type coupling 26; this sort of connection has the desirable attribute of being able to accommodate some amount of axial translation without loss of torsional transmission.

Surrounding the universal joint 25, and forming the outside of the poker hereabouts, is a bulbous conduit 27 made from a flexible fabric such as reinforced rubber-type material.

This length of conduit is fixed to the air-tight conduit 28 above it, and to the air-permeable pair of tubes beneath 14 with hermetically sealed fasteners 29, such as pipe clamps in this instance. The function of this section is to permit for lateral angular straining of the lower part of the poker with respect to the upper, such staining resulting from the activity of the vibration module 17.

The lower drive shaft 20 carries the rotation of the drive motor from the universal joint down to the eccentric weight.

A remote sensing device 30, such as a depth/distance measuring instrument, is attached to the underside of the motor housing 22, and having unrestricted view of the payload surface directly beneath. Its purpose is to determine two things: the position of the plugged end of the poker 12 with respect to the floor or sidewall of the containment vessel directly beneath; and also, where the top of the payload 13 is with respect to the top of the well screen 31 at all stages during commodity loading.

Figure 3:
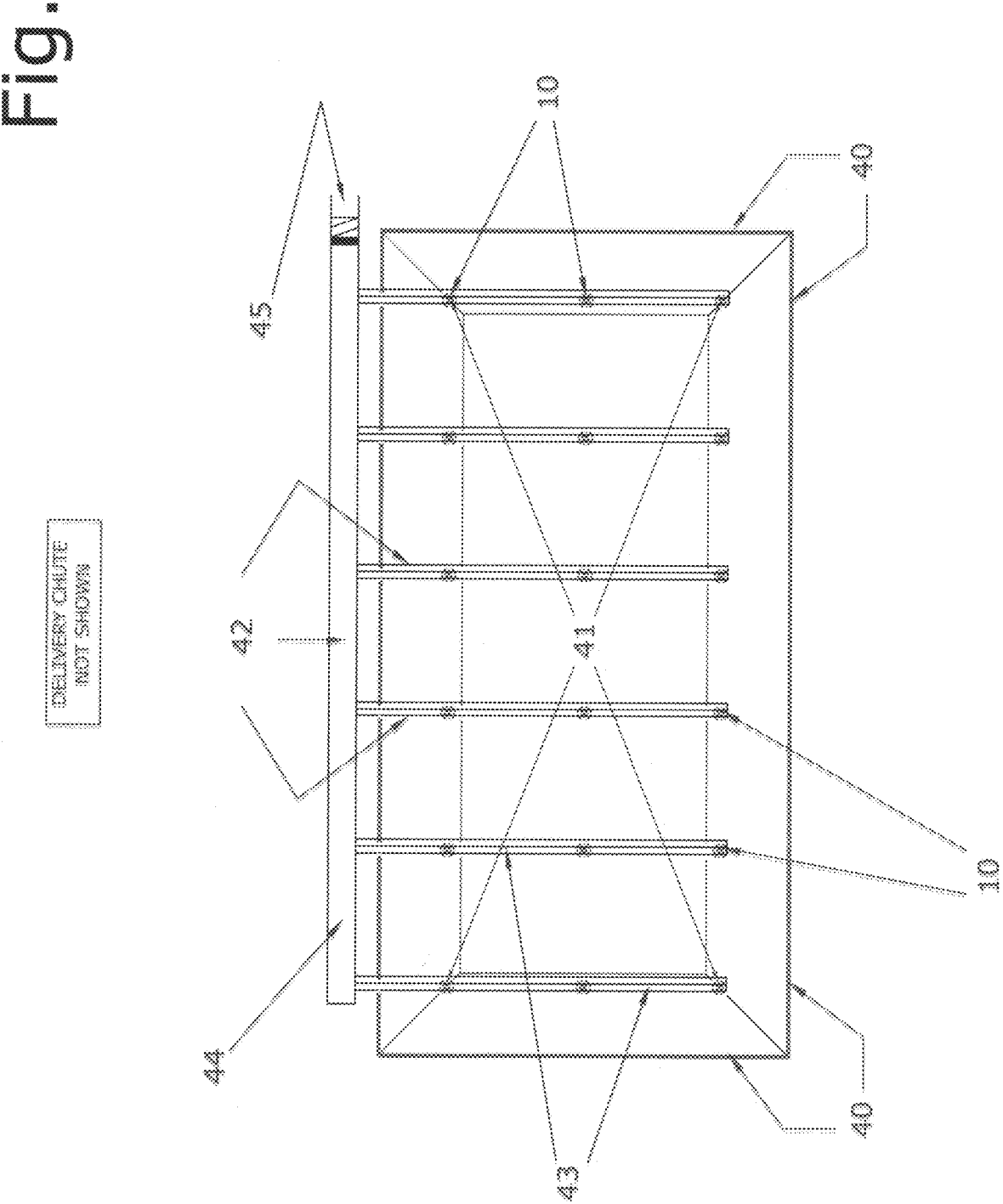
FIG. 3 is a plan view of a rectangular array (6 by 3) of pokers deployed within the confines of a containment vessel such as a railway wagon, and showing the preferred embodiment of the support structure with its cantilevered deployment distribution arms spanning the containment vessel.

With reference to FIG. 3: shown here is a plan view of an empty freight container 40 of relatively small size such as a railway wagon. Superimposed on the container outline is a "6 by 3" rectangular array 41 of pokers such as might be deployed in this case.

It is essential, for the sake of efficiency, that the poker array 41 be deployed into proper position and orientation within the containment vessel as a single integrated assembly 42, and if possible, in a single movement. One instance of such an assembly is depicted here as a plurality of horizontal conduits 43, each collecting the air discharge from the individual poker fans 11 it serves, while at the same time feeding each individual poker with the electrical power it needs to function. Although these members are hereinafter shown as cantilevered, it is obvious that these beams could be made to rest on the edge of the freight container 40 itself.

The third element of the structural assembly 42 is a pipe 44 which serves two purposes: it acts as a manifold to gather the discharges from each of the horizontal conduits 43; and, it acts as the foundational structure supporting the cantilevered conduits and the pokers hanging beneath. Furthermore, should a large filtered ventilation fan 45 be fitted to the discharge end of 44 it would serve two useful purposes: it would rid the air exhaust of dust before releasing it back to the atmosphere; and, would minimize backpressure on the individual poker fans 11.

It is anticipated that the structural assembly 42 will be formed out of mild steel or aluminum, in which case the detailed geometry of the assemblage is a simple matter of structural fabrication involving no novelty. The design criterion will be to minimize the loss of flow area available to the commodity entering from the chute. Consequently, the cantilevered manifolds 43, which are deployed between the delivery chute and the top area of the container 40, need to be slender in plan, with roofs 46 steeply pitched ("snow-shedding" A-frame type), to avoid presenting flat surfaces on which the commodity might lodge.

Figure 4A:
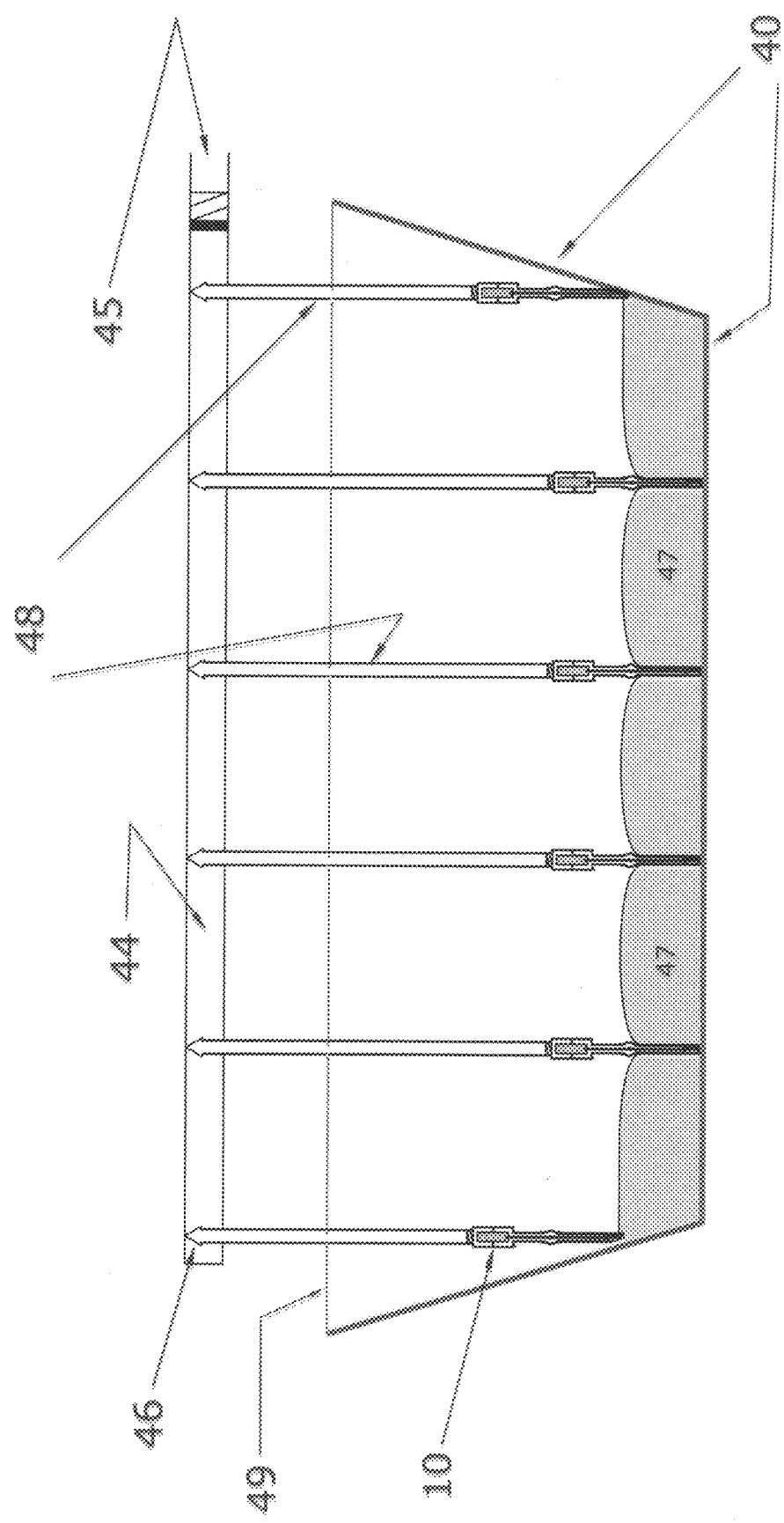
FIG. 4a is a side view of the rectangular array of pokers, shortly after the start of payload filling, with their adaptable conduit lengths adjusted so that the poker's lower end rests on the floor or sidewall of the containment area.
Figure 4B:
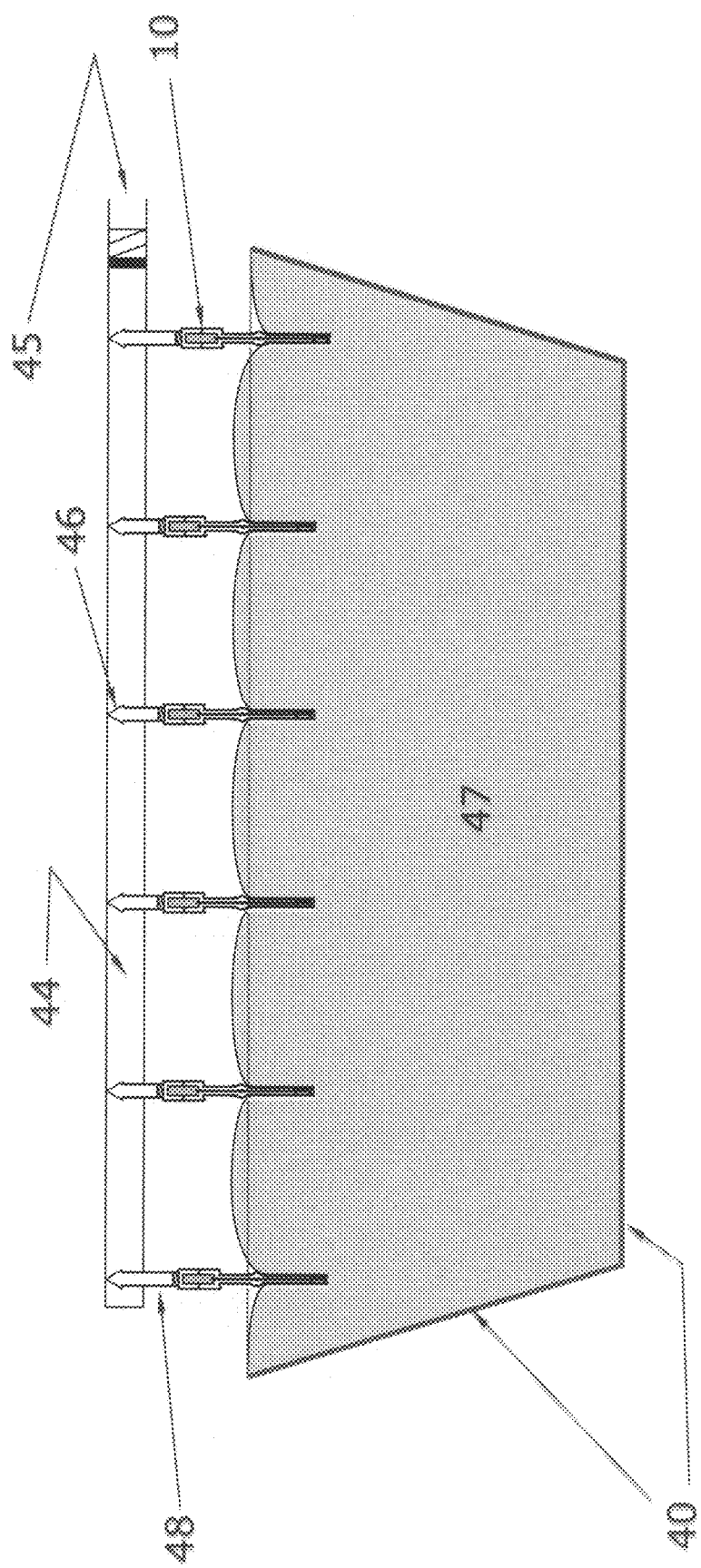
FIG. 4b shows the same profile as in FIG. 4a, but now at the termination of the filling process, and with the adaptable conduit lengths suitably shortened so that the pokers work at the optimal elevation within the payload.

FIG. 4 shows two longitudinal sections through the objects shown in plan in FIG. 3. The support structure 44 is located at some convenient height above the rim 49 of the containment vessel 40. The pitched roofs 46 are shown on top the cantilevered manifolds 43. Two stages of container filling are shown. In FIG. 4a, the payload has reached the elevation where some the more central pokers are sufficiently buried to have been activated and the deposited payload 47 is considered to have been treated thereabouts. In FIG. 4b, the container has been filled to the brim 49, and the full volume of the commodity 47 has been treated.

It is apparent that although the length of the individual pokers 10 have remained unchanged during the treatment process, that the lengths of the adaptable conduits 48 have altered substantially.

Figures 5A, 5B:
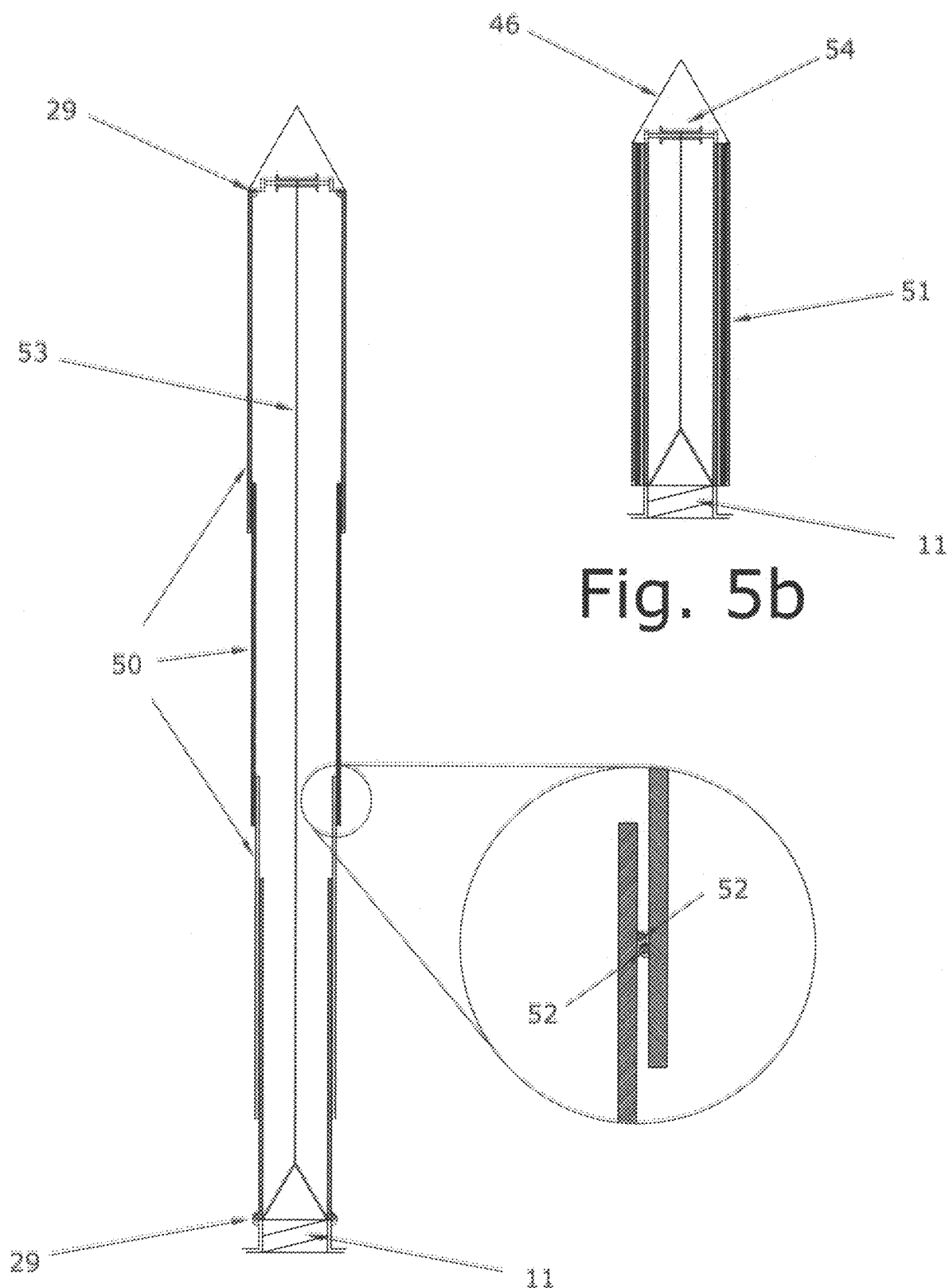
FIG. 5 are side views of a telescoping pipe-type design for the adaptable length conduit, shown on the left in its fully extended configuration, and on the right in its fully retracted position.

With reference to FIG. 5: An example of a methodology whereby a relatively air-tight adaptable length conduit 48 can be constructed is shown in FIG. 5a. It involves using a set of pipe sizes 50 which are such that each of the series can fit within its larger neighbor above itself. While this solution is not entirely hermetically sealed from the surrounding environment, it is believed to be adequately so, on the understanding that the air flow potential gradient at joints is predominantly axially upwards.

The top of the largest diameter pipe is fixed 29 to the roof 46 structure, and the bottom of the smallest diameter pipe is fixed 29 to the fan 11 housing. The natural disposition of the nested stack of pipes 51, shown in FIG. 5b is to deploy itself in its longest formation under the weight of the poker 10. So that the nested conduits cannot fall apart vertically it is enough to provide bead welds 52, in the manner shown in the enlargement in the lower right of FIG. 5a. To constrain this tendency a cable 53 is attached to the fan housing 11 at the top of the poker 10. The played-out length of this cable is controlled by a drum winch 54 advantageously located within the pitched roof 46 above each poker. This arrangement makes it possible to determine where the poker 10 resides within the payload; the position of the poker is dictated by the length of cable which the drum hoist reels out. Consequently, by making the activity of the hoist dependent upon, and controlled by, signals coming from the depth/distance sensor 30, the elevation at which the poker is then working can be optimized throughout the process of commodity treatment.

It will be appreciated by those skilled in the art that the preferred embodiments have been described in some detail but that certain modifications may be practiced without departing from the principles of the invention.

Figure 6:
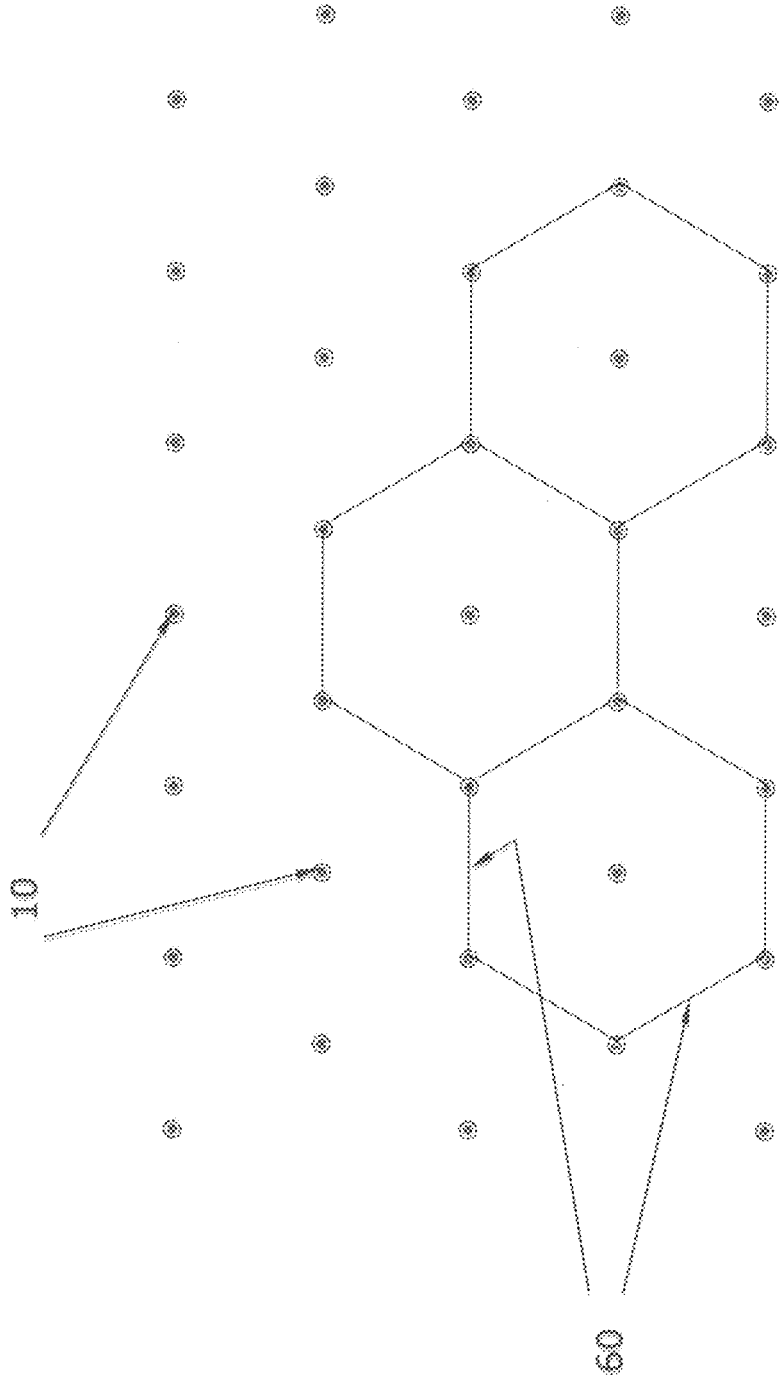
FIG. 6 is a plan view of an alternative hexagonal-type array which may be more suitable to larger containment vessels such as the hold of a merchant ship.

FIG. 6 is a depiction of a hexagonal array 60, the natural (bee-hive) cell shape, and it is suggested this configuration as possibly being better suited to larger areas such as the holds of a merchant ship.

OPERATION OF INVENTION

The goal in the deployment of an array of these tools is to avoid interfering with the normal filling rate of the transportation vessel, and also to limit any complication to established procedures as far as possible.

Sometime before the arrival of the transportation vessel at the loading bay, the integrated poker array and its support structure, would be appropriately positioned beneath the delivery chute.

At that time the speed control of the electric motors within the pokers would be set to provide the particular rate of rotational vibration previously determined to be optimal for the type of commodity to be treated on this particular occasion.

The winch cables would be activated so as to set the individual lengths of the adjustable conduits in order that the bottom plug of each poker comes to rest just above the floor or sidewall of the vessel at each of their pre-designated positions.

As soon as the containment vessel arrived in its assigned position beneath the commodity chute the support structure would lowered/rotated the poker array into it in one motion. Electrical power would be made available to the apparatus as soon as loading commenced but power to the individual pokers would not be switched on until the depth sensor of each particular poker indicated that the payload material had covered the top of that poker's well screen. This is to avoid swamping the air extraction capacity of the manifolds.

As loading progressed, and various well screens became submerged beneath the payload, such pokers would receive power and both its vibrator and the fan turned on, thereby forcing the individual particles of the dry mass commodity to adopt a closer packing arrangement.

Shortly thereafter the cable winch, in response to indications from the sensors, would begin to withdraw individual pokers towards the top of the vessel so as to apply the vibratory and air suction most effectively, that is, close beneath the surface of the loose mass. In other words, each poker would be individually raised to keep pace with containment filling at each of their separate locations.

It is further contemplated that this apparatus might advantageously be fixed to the chute delivering the payload to the container.

Because the functional elements of the apparatus are all driven by electrical power, and their activity controlled by electronic sensors, this system lends itself to robotization. The computer program required for full automation of the process is a rather simple matter.

What is claimed is:

1. An apparatus for reducing a volume of a dry particulate mass, the apparatus comprising:
- a container for holding the dry particulate, the container being open on a top surface thereof; and
- one or more pokers extending into the container, each of the one or more pokers comprising:
  - an extraction fan, the extraction fan configured to maintain sub-atmospheric pressure within the poker;
  - an eccentric weight, the eccentric weight configured to rotate within the poker;
  - a motor configured to provide rotational power to the eccentric weight;
  - a drive shaft extending within the poker and operatively connecting the eccentric weight with the motor to effect rotation of the eccentric weight, the drive shaft comprising:
    - a first drive member extending from the motor;
    - a second drive member extending from the eccentric weight; and
    - a universal joint connecting the first drive member with the second drive member;
  - a rigid, substantially cylindrical air-impermeable section surrounding at least a portion of the first drive member;
  - a rigid, substantially cylindrical air-permeable section surrounding at least a portion of the second drive member and at least a portion of the eccentric weight, the air-permeable section adapted to permit passage of air into the poker and to prevent passage of the dry particulate into the poker; and
  - a flexible conduit extending between the air-impermeable section and the air-permeable section and surrounding the universal joint, the flexible conduit adapted to flex in response to rotation of the eccentric weight within the air-permeable section.

2. The apparatus of claim 1, wherein each of the one or more pokers further comprises a sensor for detecting a distance between a level of the dry particulate and an upper edge of the air-permeable section.

3. The apparatus of claim 2, wherein the one or more pokers comprises a plurality of pokers.

4. The apparatus of claim 3 further comprising:
- a structural member extending across at least a portion of the container; and
- a plurality of adaptable-length conduits, wherein each of the plurality of adaptable-length conduits is connected to the structural member and to a corresponding one of the pokers, and wherein a length for each of the adaptable-length conduits may be varied to move the corresponding one of the pokers within the container.

5. The apparatus of claim 4, wherein each of the plurality of adaptable-length conduits is configured to move the corresponding one of the pokers within the container depending on the distance between the level of dry particulate and the upper edge of the air-permeable section of the corresponding one of the pokers.

6. The apparatus of claim 5, wherein each of the plurality of adaptable-length conduits is further configured to move the corresponding one of the pokers independently of other ones of the pokers.

7. The apparatus of claim 4, wherein the adaptable-length conduits comprise a plurality of nested sections.

8. The apparatus of claim 1, wherein the conduit has a bulbous shape.

9. The apparatus of claim 1, wherein the conduit is made from rubber.

10. The apparatus of claim 1, wherein the air-permeable section comprises an inner perforated pipe surrounded by a well screen.

* * * * *